United States Patent [19]

Schmars et al.

[11] Patent Number: 5,448,354
[45] Date of Patent: Sep. 5, 1995

[54] ACCELERATION DISTORTION RESISTANT RING LASER GYRO

[75] Inventors: William T. Schmars, Fullerton; Kenneth L. Steele, Santa Ana, both of Calif.

[73] Assignee: Rockwell International Corporation, Seal Beach, Calif.

[21] Appl. No.: 983,490

[22] Filed: Nov. 30, 1992

Related U.S. Application Data

[63] Continuation-in-part of Ser. No. 737,293, Jul. 29, 1991, abandoned.

[51] Int. Cl.⁶ .............................................. G01C 19/66
[52] U.S. Cl. ....................................... 356/350; 372/107
[58] Field of Search ................... 356/350; 372/107, 94

[56] References Cited

U.S. PATENT DOCUMENTS

4,407,583 10/1983 Simms .................................. 356/350
4,410,274 10/1983 Ljung .................................. 356/350

Primary Examiner—Samuel A. Turner
Attorney, Agent, or Firm—H. Fredrick Hamann; George A. Montanye; Tom Streeter

[57] ABSTRACT

The ACCELERATION DISTORTION RESISTANT RING LASER GYRO (RLG) (10) shown here includes a control mirror (12) subject to distortion beyond the path length control capabilities of the RLG (10) when subjected to intense translational acceleration in the direction (20) perpendicular to the face of the control mirror (12). An anti-parallel compensating mirror (14) is provided to offset the path length change. Additional design flexibility may be obtained by replacing the compensating mirror (14) with a compensating group of mirrors.

16 Claims, 6 Drawing Sheets

ACCELERATION DISTORTION RESISTANT RING LASER GYRO

This application is a continuation-in-part of parent application Ser. No. 07/737,293, filed Jul. 29, 1991, now abandoned, by the same applicant and with the same title; and the disclosure of same is incorporated herein by reference.

BACKGROUND OF THE INVENTION

The present invention relates to ring laser gyroscopes, also known as ring laser gyros or RLGs, and has particular relation to RLGs which are subjected to intense translational acceleration.

When an RLG is subjected to moderate translational acceleration, it distorts moderately, thereby somewhat changing its optical path in length, shape, or otherwise. A control mirror, ordinarily used to compensate for thermally induced changes in the optical path, may additionally compensate for accelerative changes. When the RLG is subjected to intense acceleration, however, it will distort beyond the ability of the control mirror to compensate.

It might be thought that accelerative distortion of the RLG takes place in the monolithic block which holds the mirrors precisely in place. This is, in fact, the mechanism for thermal distortion. As it happens, however, the bulk of accelerative distortion takes place in the control mirror itself.

The reason for this distortion of the control mirror comes from its purpose. The purpose of a control mirror is to readily change position and/or direction. It does so in response to the force provided by a control device bonded to its rear side, typically a piezo-electric transducer (PZT). Its response to this desirable force is indistinguishable from its response to the parasitic force produced by the mass of the control mirror (and of the PZT) in response to the acceleration.

This parasitic accelerative force generally does not significantly affect the direction of the control mirror, and such minor directional changes as it does produce may generally be accommodated by suitable active alignment apparatus. However, this parasitic accelerative force, if large enough, may drive the control mirror to a position so far from its rest position as to exceed the ability of the path length control (PLC) apparatus to compensate for it. This can take place whether the control mirror is controlling path length (that is, is part of the PLC apparatus), or is controlling some other parameter or parameters.

SUMMARY OF THE INVENTION

Accelerative distortion of the control mirror may be brought back within the limits of the PLC apparatus by providing a compensating mirror which responds by acceleratively lengthening the optical path length (OPL) whenever the control mirror acceleratively shortens it, and vice versa. This compensating mirror may be a second control mirror, if desired. If it is a second control mirror, it may control either the same or a different parameter (or parameters) as the parameter (or parameters) controlled by the first control mirror. The compensating mirror may be replaced with a compensating group of mirrors, one or more of which may likewise be control mirrors, with a like variety of parameters to control.

The displacement of a mirror under acceleration is proportional both to its mass and to its compliance (displacement per unit force). For any given acceleration, the direction of some mirrors will be such that, when the RLG is accelerated, their displacements increase the OPL; and the direction of other mirrors will be such that their displacements in response to the same acceleration reduce the OPL.

Any acceleration may be resolved into a component parallel to the control mirror and a component perpendicular to the control mirror. The response of the control mirror (or any mirror) to acceleration parallel to the mirror is generally negligible. Therefore, the parallel component of the acceleration is handled by selecting the mass-compliance product of each of the compensating group of mirrors (which may be a single mirror) such that the sum of the changes in OPL due to each mirror is negligible.

A unit acceleration perpendicular to the control mirror will produce, for each mirror, an OPL change (positive or negative) which is also proportional to the mass-compliance product of the mirror. These mass-compliance products, taken together, therefore also determine the total change in OPL due to this unit perpendicular acceleration. Each mass-compliance product can be proportionately increased or decreased to the point where the total OPL change is equal but opposite to the change induced by the control mirror in response to the same unit perpendicular acceleration. If desired, the mass-compliance product of the control mirror may be changed instead of, or in addition to, this proportionate change. This proportionate change also proportionately changes the parallel response, but the parallel response has been constructed to be negligible, so the changed parallel response will also be negligible.

The typical RLG mirror responds to the vector combination of these acceleration components as though the combination were a linear combination of them. An acceleration of arbitrary magnitude and direction may therefore be resolved into its components parallel and perpendicular to the control mirror. The compensating mirrors are selected to match the control mirror in such a way that neither a unit parallel acceleration nor a unit perpendicular acceleration will have more than a negligible effect on the OPL. Therefore, any linear combination of these two components, that is, any acceleration at all (within very broad limits), will also have a negligible effect.

BRIEF DESCRIPTION OF THE DRAWINGS

The objectives, features, and advantages of the present invention may be seen with reference to the following drawings, in which.

DETAILED DESCRIPTION OF A PREFERRED EMBODIMENT

In many situations, it is convenient for the compensating mirror to be identical to the control mirror, both in mass (including the mass of the associated PZT) and in compliance. In this case, the compensating mirror is made anti-parallel (parallel, but facing in the opposite direction) to the control mirror. When, as is inherent in the acceleration of a rigid object such as an RLG, the mirrors undergo equal acceleration, the use of two anti-parallel mirrors produces equal and opposite displacements. Equal displacements in opposite directions in turn produce a total path length change of zero.

Figure 1:
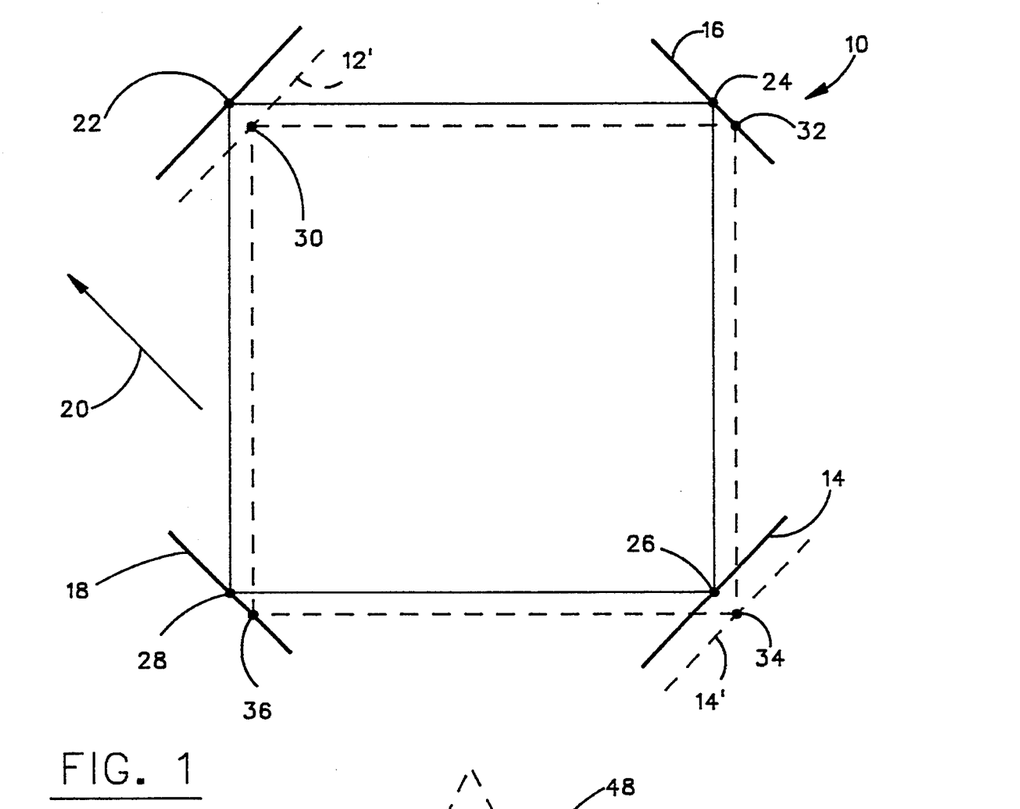
FIG. 1 shows a square RLG with a compensating mirror diagonally opposite the control mirror.

This is seen in FIG. 1, in which a square RLG 10 comprises a control mirror 12, a compensating mirror 14 anti-parallel to the control mirror 12, and two rigid mirrors 16 and 18. Accelerating the RLG 10 in the direction of arrow 20 displaces control mirror 12 inwardly to new location 12', but it also displaces compensating mirror 14 outwardly by the same distance. The original optical path 22, 24, 26, 28 is thus displaced down and to the right to new optical path 30, 32, 34, 36, without changing its shape or, more importantly, the length of its perimeter. Accelerating the RLG 10 perpendicular to the direction of arrow 20 has no effect on the control mirror 12 or the compensating mirror 14, since it is parallel to these mirrors 12, 14. Neither parallel nor perpendicular acceleration has any effect on the rigid mirrors 16 and 18, since they are rigid, that is, their compliance is small enough to be negligible.

It is not necessary for the mass and the compliance to be identical in the two anti-parallel mirrors 12 and 14. It is necessary only for the product of the mass and compliance of the control mirror 12 to equal that of the compensating mirror 14. If this is true, equal displacements will result, further resulting in the desired absence of total path length change.

Anti-parallel mirrors are sometimes undesirable. Among other things, they can only be provided in an RLG with four or more legs. If a triangle is required, or there is a reason to use some other polygon without anti-parallel mirrors, accelerative distortion may still be reduced or eliminated by the use of a pair of semi-parallel mirrors (SPMs), as is described in detail in the next paragraph. "Semi-parallel" means that two mirrors are parallel to each other with respect to the component perpendicular to the control mirror, and are anti-parallel to each other with respect to the component parallel to the control mirror. This theoretical definition is better understood by considering the following example.

Figure 2:
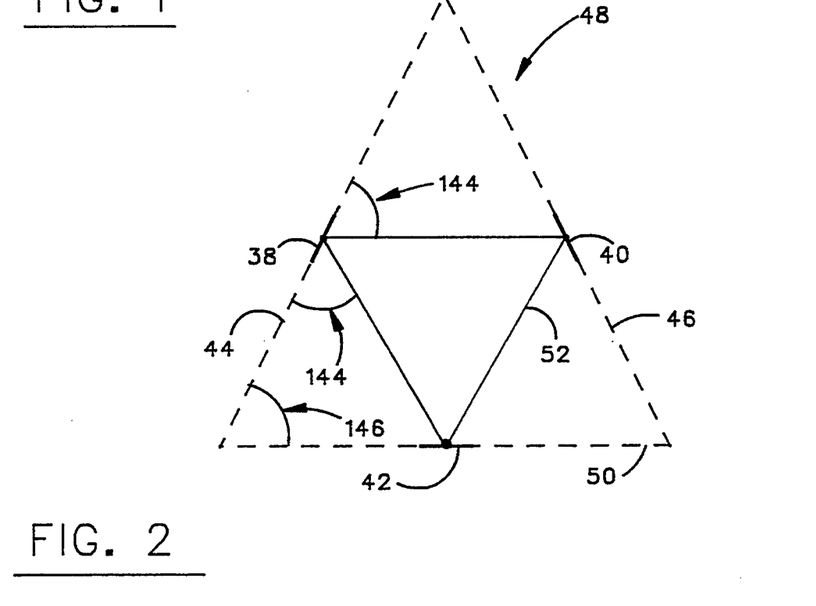
FIG. 2 shows a triangular optical path formed by mirrors on the sides of an isosceles triangle.
Figure 3:
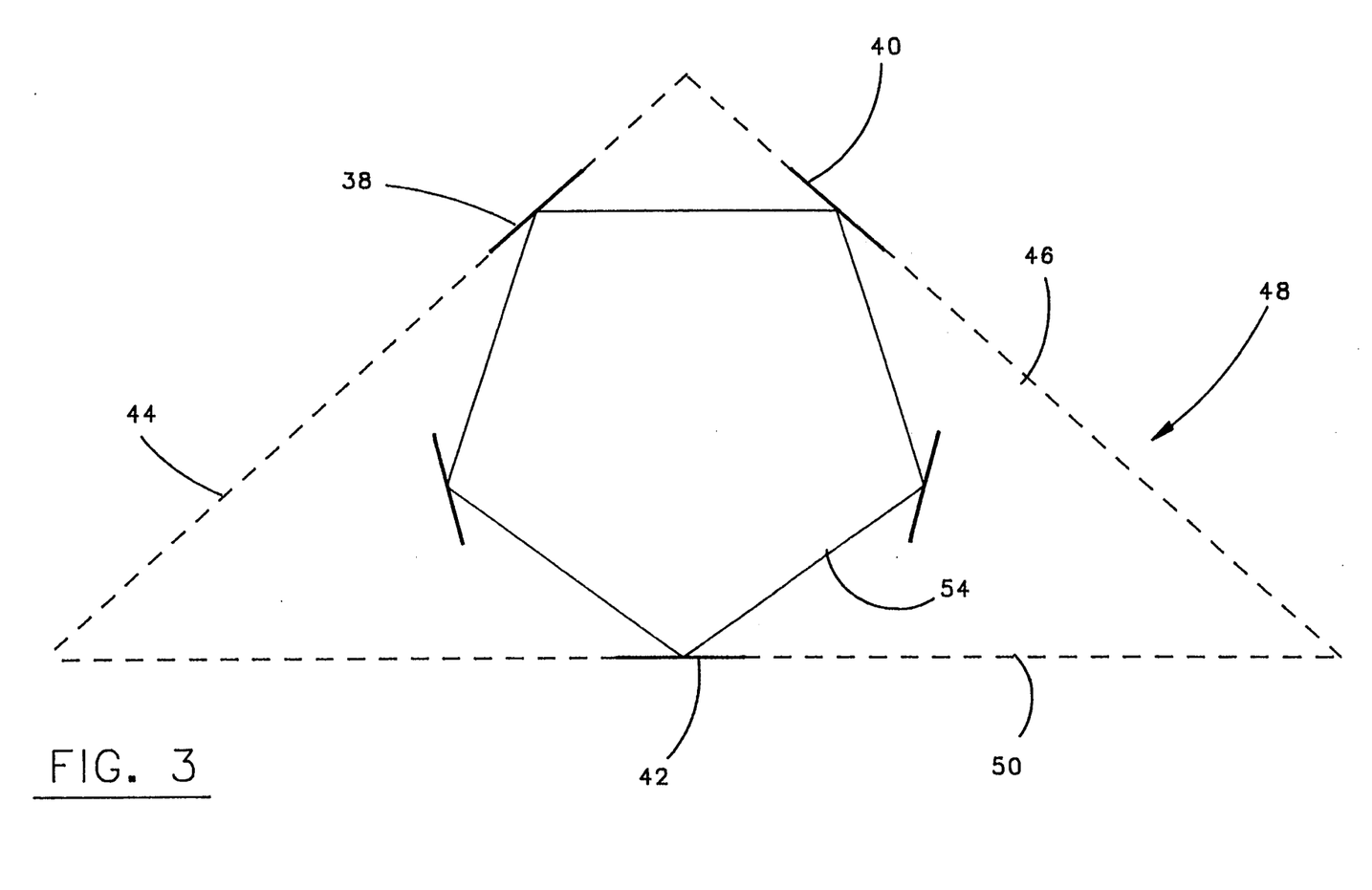
FIG. 3 is similar to FIG. 2, but shows a pentagonal path.

As seen in FIGS. 2 and 3, mirrors 38 and 40 are semi-parallel to each other with respect to a control mirror 42. They lie on the legs 44, 46 of an isosceles triangle 48, and the control mirror 42 lies on the base 50 of the triangle 48. The optical path 52 may be the inscribed triangle, as is shown in FIG. 2, or it may be a more complex polygon, such as the pentagon 54 shown in FIG. 3. The optical path 52 may be an equilateral triangle if desired.

Figure 4:
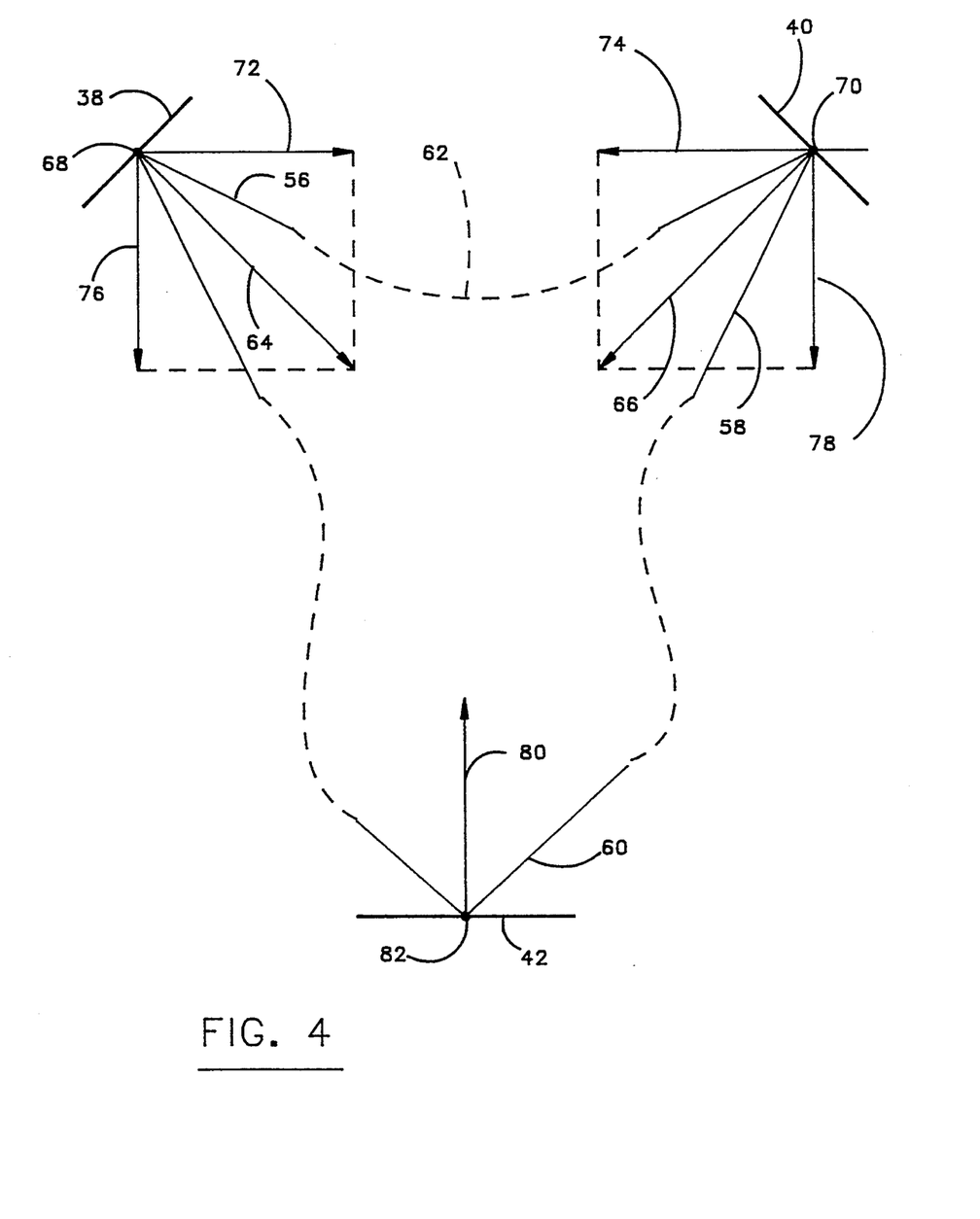
FIG. 4 generalizes FIGS. 2 and 3, and shows reflection components.

FIG. 4 shows a generalized version of FIGS. 2 and 3. Portions 56, 58, and 60 of the optical path 62 are reflected from mirrors 38, 40, and 42 respectively. The remainder of optical path 62 is left deliberately undefined, so as not to unduly restrict the generality of the present invention.

SPMs 38 and 40 have directions 64 and 66 defined by their unit normals at beam impact points 68 and 70. These directions 64 and 66 have components 72 and 74 parallel to the control mirror 42, and have components 76 and 78 perpendicular to the control mirror 42. The perpendicular components 76 and 78 are equal; the parallel components 72 and 74 are equal and opposite. Thus, considering only the parallel components 72 and 74, the SPMs 38 and 40 are anti-parallel to each other (and have no meaningful relationship to the control mirror 42). Considering only the perpendicular components 76 and 78, the SPMs 38 and 40 are parallel to each other. They are also anti-parallel to the control mirror 42, which has a direction 80 from its beam impact point 82. The significance of this last fact is discussed below. The term "semi-parallel" is an apt description for two mirrors 38 and 40 which are parallel to each other with respect to one component 76, 78, yet are anti-parallel to each other with respect to an orthogonal component 72, 74.

Figure 5:
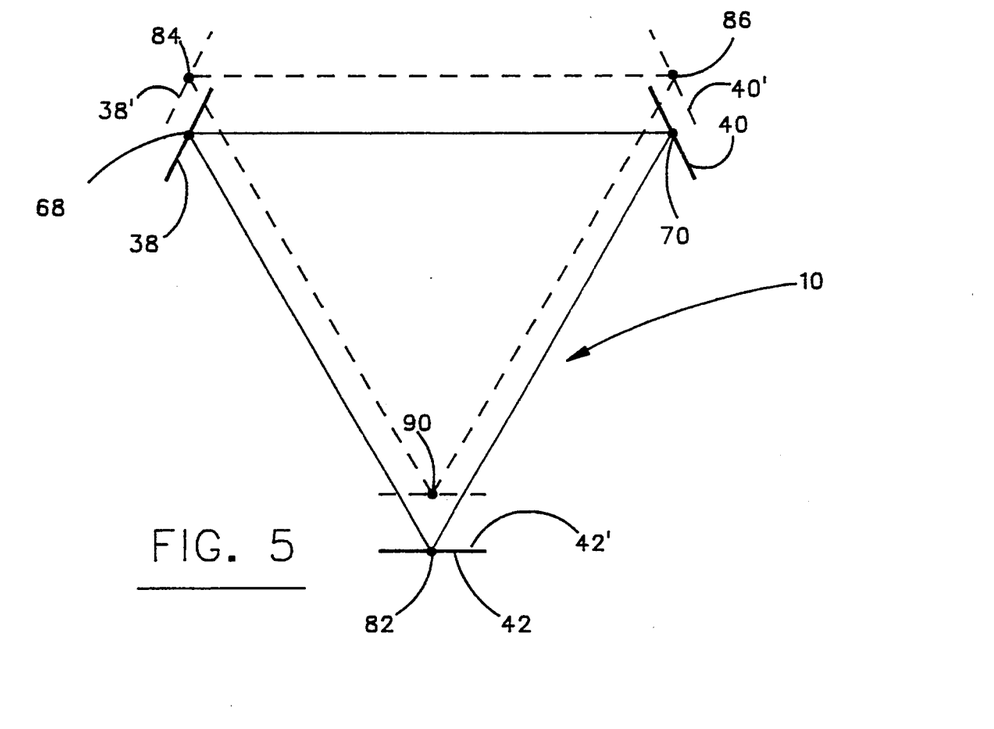
FIG. 5 shows an RLG accelerating towards the rear of the control mirror.
Figure 6:
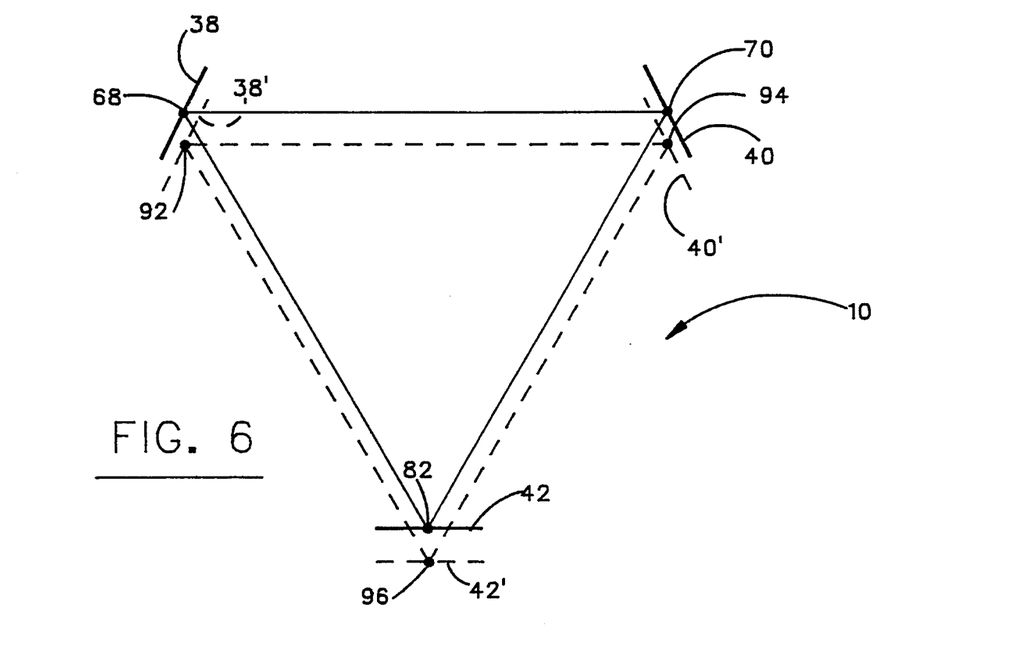
FIG. 6 shows an RLG accelerating towards the front of the control mirror.

As shown in FIGS. 5 and 6, when the RLG 10 is accelerated perpendicular to the control mirror 42, the SPMs 38 and 40 either move away from each other and from the control mirror 42 (FIG. 5), or they move toward each other and toward the control mirror (FIG. 6). These motions can be recast into a net motion only away from the control mirror (FIG. 5), or only toward the control mirror (FIG. 6). In FIG. 5, the optical path moves from 68, 70, 82 to 84, 86, 90. In FIG. 6, it moves to 92, 94, 96.

The mass-compliance product of the control mirror 42 can be set to a suitable fraction (or multiple) of the mass-compliance product of the SPMs 38 and 40 to offset this net motion. The offset need not be exact. It is sufficient if it is small enough to be negligible, that is, within the operating range of the PLC apparatus. The entire optical path is thus displaced perpendicular to the control mirror.

In the isosceles triangles shown in FIGS. 5 and 6, the mass-compliance product of each of the SPMs 38 and 40 should equal that of the control mirror 42. The fact that the SPMs 38 and 40 do not face exactly in (or opposite to) the direction of acceleration means that their displacements perpendicular to their faces are reduced. However, this non-alignment with the direction of acceleration also means that a unit displacement has a greater effect on the OPL. These two factors cancel each other out, regardless of the magnitude of the non-alignment.

Figure 7:
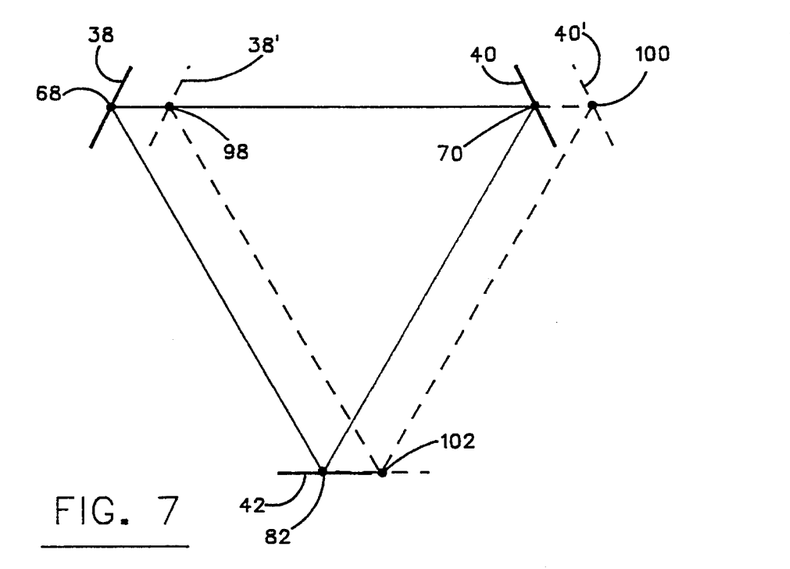
FIG. 7 shows an RLG accelerating parallel to the control mirror.

FIG. 7 shows what happens when the RLG 10 is accelerated parallel to the control mirror 42. The SPMs 38 and 40 have a net motion parallel to the control mirror 42, thereby moving the beam impact points from 68 and 70 to 98 and 100. The acceleration will have no effect on the control mirror 42. The beam impact point 82 on the control mirror 42 will, however, be moved by this net motion distance to new location 102. The entire optical path 68, 70, 82 is thus displaced parallel to the control mirror 42 to new optical path 98, 100, 102.

The foregoing discussion has assumed that the light beam contained in optical path 62 (see FIG. 4) strikes each SPM 38 and 40 at the same angle. This will be true when the optical path 62 forms any of a wide variety of polygons, such as the isosceles triangle 52 shown in FIG. 2, or the regular pentagon 54 shown in FIG. 3.

Figure 8:
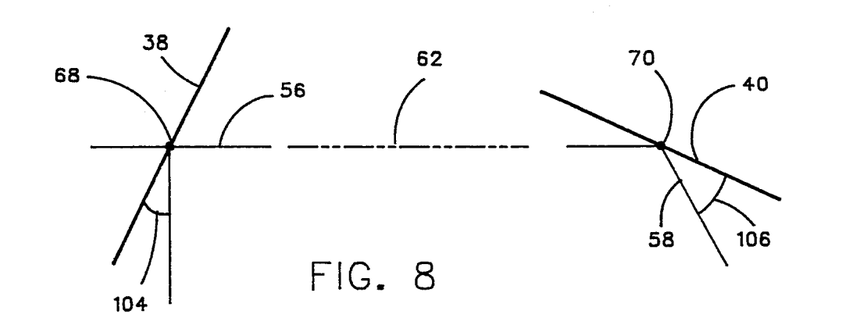
FIG. 8 shows the semi-parallel mirrors no longer on the sides of an isosceles triangle.
Figure 9:
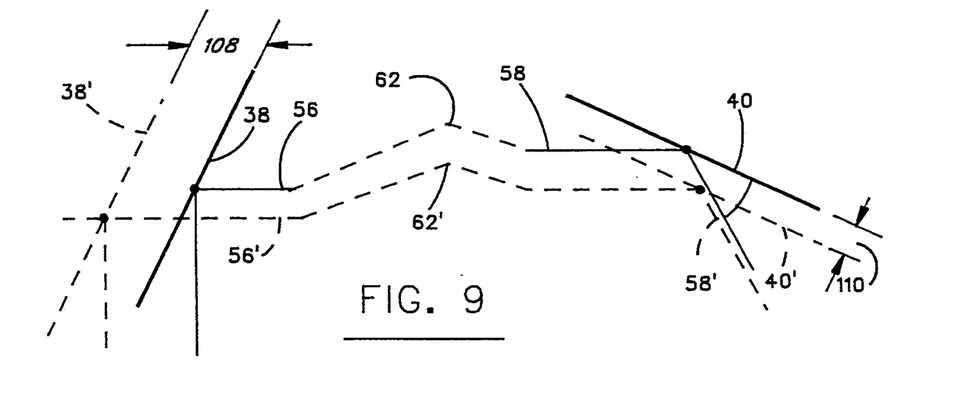
FIG. 9 shows the results of accelerating the mirrors shown in FIG. 8.

FIGS. 8 and 9 show that this limitation is not a requirement. When light beam 62 strikes SPMs 38 and 40, it may strike SPM 38 at an angle 104 which differs from the angle 106 at which it strikes SPM 40. The change in OPL is the product of the displacement 108, 110 of the mirror 38, 40 (or change of the displacement of the mirror, if not being displaced from its rest position) and the cosecant of the angle 104, 106 between the SPM 38, 40 and the light beam 56, 58. Displacement 108 is shown as positive, in that the path length of modified optical path 56' is greater than that of unmodified optical path 56. A component with a singly or doubly primed reference numeral shows the singly or double changed position of the same component with an unprimed reference numeral. Displacement 110 is shown as negative, in that the path length of modified optical path 58' is less than that of unmodified optical path 58. Adjusting the mass-compliance product of each mirror so that it is inversely proportional to this cosecant will compensate for this effect.

It is also not required that the number of SPMs 38, 40 be limited to two. A plurality of pairs of SPMs may be used. More generally, pair-wise semi-parallelism may be expanded to collective semi-parallelism. Each mirror responds to a unit acceleration parallel to the control mirror by changing the OPL, positively or negatively, by a distance fixed for that mirror. Collective semi-parallelism occurs when the sum of these distances is zero (or is small enough to be handled by the path length control apparatus).

Figure 10:
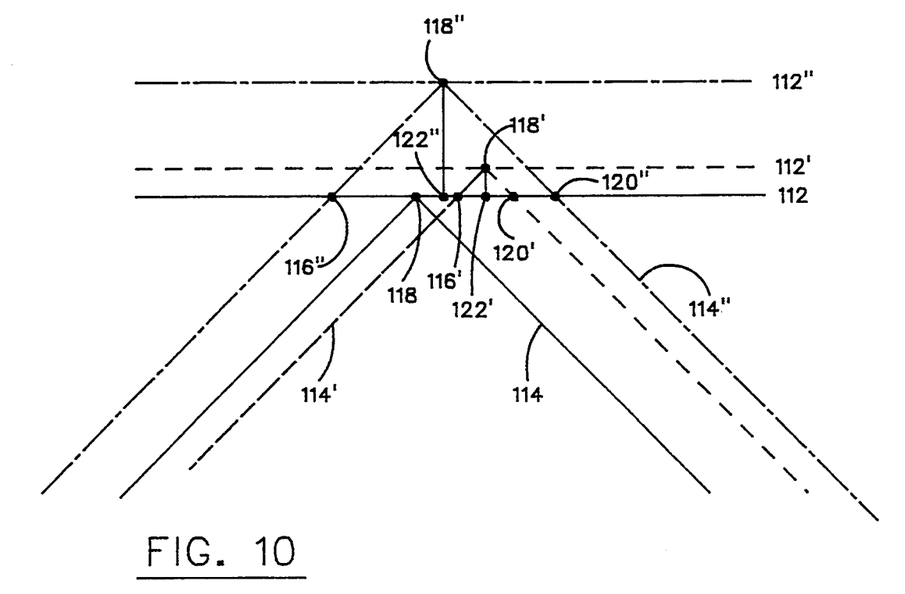
FIG. 10 demonstrates that OPL changes are proportional mirror displacement changes.

The displacement of each mirror is proportional to the acceleration parallel the control mirror. FIG. 10 shows how the change in the OPL is proportional to the displacement. A mirror 112 reflects a beam 114. The mirror 112 is successively displaced to locations 112' and 112", resulting in a shift of the beam 114 to locations 114' and 114". First triangle 116', 118', 120' formed by beam 114' as it crosses the original location of mirror 112 is similar to (has the same shape as) second triangle 116", 118", 120" formed by beam 114" as it crosses the original location of mirror 112.

This similarity occurs because the mirror 112 is displaced laterally, but is not significantly rotated, by translational acceleration. Since this is equally true of all the other mirrors of the RLG 10, each leg of the displaced beams 114' and 114" will be parallel to the original beam 114. The displacements between beams may be different on opposite sides of the undisplaced beam impact point 118 (in FIG. 10, for example, crossing points 116' and 116" are on opposite sides of beam impact point 118). However, moving the first displaced impact point 118' along the first displaced mirror location 112' will not change the size or shape of the first triangle 116', 118', 120', nor will moving the second displaced impact point 118" along the second displaced mirror location 112" change the size or shape of the second triangle 116", 118", 120".

Thus, the first additional OPL 116' to 118' to 120' is not affected by the location of the first displaced beam impact point 118' on the first displaced mirror location 112'. Further, this first additional length is proportional to the altitude 118' to 122' of the first triangle, that is, to the displacement of the mirror 112 between its rest and first displaced positions. Likewise, the second additional OPL 116" to 118" to 120" is not affected by the location of the second displaced beam impact point 118" on the second displaced mirror location 112". Further, this second additional length is proportional to the altitude 118" to 122" of the second triangle, that is, to the displacement of the mirror 112 between its rest and second displaced positions.

The sum of the path length changes is therefore proportional not only to a linear combination of the displacements of the mirrors, but also to the acceleration parallel to the control mirror. A vanishingly small total path length change for a unit acceleration parallel to the control mirror will therefore be accompanied by an acceptably small path length change for any reasonable acceleration, even a fairly large one.

Collective semi-parallelism requires not only that the SPMs be collectively parallel to one another, as described above, but also that they be collectively anti-parallel to the control mirror. Just as each mirror responds to a unit acceleration parallel to the control mirror by changing the OPL by a distance fixed for that mirror, so each mirror responds to a unit acceleration perpendicular to the control mirror by changing the OPL by a distance fixed for that mirror. These OPL changes are proportional to the acceleration perpendicular to the control mirror, and their sum is likewise proportional to this acceleration. This sum may be selected so that it is equal (or close) but opposite to the path length change induced by the control mirror. The mass-compliance products of the compensating mirrors, the control mirror, or both may be adjusted to produce this result.

Each mirror therefore has a net parallel OPL effect, defined as the change in the OPL impressed by the mirror in response to a unit acceleration parallel to the control mirror. Each mirror likewise has a net perpendicular OPL effect, defined as the change in the OPL impressed by the mirror in response to a unit acceleration perpendicular to the control mirror. These net OPL effects are determined by the mass of the mirror (and associated PZT), the compliance of the mirror, the direction of the mirror with respect to the control mirror, and the direction of the mirror with respect to the optical path. The directions cannot be easily changed, but the mass and compliance (and, thus, their product) can be easily changed.

Changing this product will proportionately change both the net parallel OPL effect and the net perpendicular OPL effect. Mathematically, $$PRm = Am \times Cm, \quad (1)$$

and $$PPm = Bm \times Cm, \quad (2)$$

where $PRm$ is the net parallel OPL effect of the mth mirror and $PPm$ is the net perpendicular OPL effect of the mth mirror. $Cm$ is the (easily changed) mass-compliance product of the mth mirror, and $Am$ and $Bm$ are constants fixed by the (not easily changed) geometry of the RLG. The 0th mirror is the control mirror. We thus obtain (for, e.g., the pentagon of FIG. 3):

| | |
|---|---|
| (3) $PR0 = 0$, | (4) $PP0 = B0 \times C0$, |
| (5) $PR1 = A1 \times C1$, | (6) $PP1 = B1 \times C1$, |
| (7) $PR2 = A2 \times C2$, | (8) $PP2 = B2 \times C2$, |
| (9) $PR3 = A3 \times C3$, | (10) $PP3 = B3 \times C3$, |

-continued

| (11) PR4 = A4 × C4, and | (12) PP4 = B4 × C4. |

Polygons with a greater or lesser number of sides will produce a correspondingly greater or lesser number of equations and unknowns.

We want all of the net parallel OPL effects to cancel out, i.e.:

$$PR1 + PR2 + PR3 + PR4 = 0, \quad (13)$$

or $$(A1 \times C1) + (A2 \times C2) + (A3 \times C3) + (A4 \times C4) = 0. \quad (14)$$

We also want the sum of all of the net perpendicular OPL effects of the compensating mirrors to be equal and opposite to that of the control mirror, i.e.:

$$PP1 + PP2 + PP3 + PP4 = -PP0, \quad (15)$$

or $$(B1 \times C1) + (B2 \times C2) + (B3 \times C3) + (B4 \times C4) = -(B0 \times C0). \quad (16)$$

There are therefore only two equations, (14) and (16), to be satisfied (preferably exactly, but at least approximately), and yet there are fully five parameters (C0, C1, C2, C3, and C5) which are available to the engineer to satisfy them. Even the minimum RLG—a triangle—will have three parameters available. The exact selection of the values for these parameters to assume is a design choice for the engineer, so that he may optimize many other factors while retaining acceleration distortion resistance.

The forgoing description has been made in dynamic terms, wherein the RLG is actually subjected to intense acceleration. Equivalently, it may be made in static terms, examining only the materials and their dimensions, even when the RLG is not undergoing any acceleration.

As is conveniently seen in FIG. 2, the optical path 52 defines, at each mirror 38, a reflection angle 144 between the optical path 52 and the surface of the mirror 38. The control mirror 42 defines an offset angle 146 with respect to each other mirror 38. The offset angle 146 is equal to the angle between a plane 50 containing the control mirror 42 and a plane 44 containing the other mirror 38. If the control mirror 42 and the other mirror 38 are parallel or coplanar, then the offset angle 146 is zero. The offset angle 146 between the control mirror 42 and itself is also zero. Similar angles are defined for mirror 40, but are omitted from FIG. 2 for clarity of presentation.

Each mirror 38, 40, 42 has a mass and a compliance. The mass includes the mass of any control apparatus mounted on the mirror. The compliance is the displacement through which the mirror moves in response to a unit force perpendicular to its surface. The force may be due to acceleration, atmospheric pressure, a piezoelectric control device, or any other source. The compliance of a mirror is a function of its cross section, thickness, material from which constructed, and a number of other factors. It is conveniently measured by actually subjecting the mirror to a unit force, but exists even in the absence of any force. It is only a mirror's displacement, and not its compliance, which depends upon a force being actually applied.

Each mirror has a characteristic parallel value equal to the product of its mass, its compliance, the cosecant of its reflection angle, and the sine of its offset angle. The characteristic parallel value is, essentially, the change in the optical path length due to the motion of the mirror in response to a unit acceleration parallel to the surface of the control mirror; that is, in dynamic terms, it is the net parallel OPL effect.

Each mirror also has a characteristic perpendicular value equal to the product of its mass, its compliance, the cosecant of its reflection angle, and the cosine of its offset angle. The characteristic perpendicular value is, essentially, the change in the optical path length due to the motion of the mirror in response to a unit force perpendicular to the surface of the control mirror; that is, in dynamic terms, it is the net perpendicular OPL effect.

The sum of the characteristic parallel values of the mirrors can be made at least approximately zero, and the sum of the characteristic perpendicular values of the mirror can simultaneously be made at least approximately zero. The reflection angle and offset angle of each mirror may be dictated by the application, thereby dictating the product of the appropriate trigonometric functions. The mass-compliance product of each of the mirrors remains, however, within the designer's control. Even with only three mirrors, this situation creates two simultaneous equations in three variables, which readily offer a range of solutions. These solutions may then be further optimized to improve other design criteria.

The foregoing discussion has assumed that the optical path lies in a single plane. This is necessary if there are only three mirrors, but additional mirrors open up the opportunity for a non-planar optical path. In this situation, the characteristic parallel value will have two components, each defined by a separate direction parallel to the control mirror. These two directions are conveniently, but not necessarily, made perpendicular to each other. Driving the characteristic parallel value to zero requires, in this case, that each component be driven to zero. Driving some linear combination of the components to zero will not suffice unless the acceleration can reasonably be anticipated to come only from the corresponding linear combination of the two directions. As before, the broad range of mass-compliance products available to the designer creates three equations in four (or more) unknowns, which offer a similarly broad (or broader) range of solutions.

Figure 11:
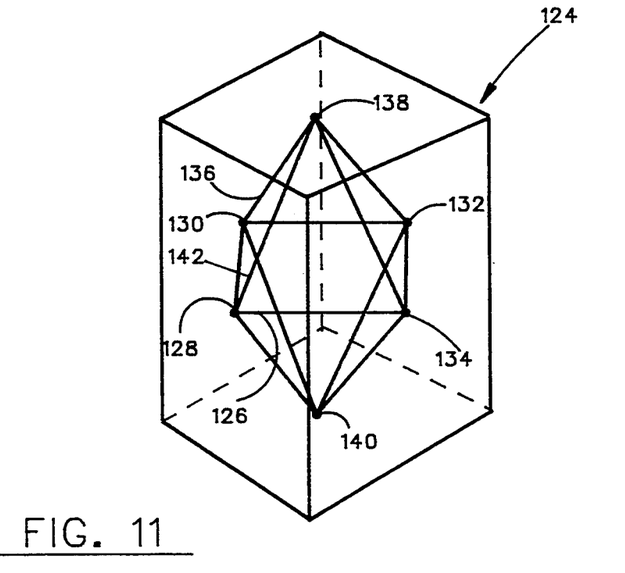
FIG. 11 shows how three RLGs with separate axes may share a common monolithic block.

A single RLG has been shown, but the present invention applies with equal force to multiple RLGs, typically (but not necessarily) one for roll, one for pitch, and one for yaw. Multiple RLGs may or may not share a common monolithic block, and may or may not share one or more mirrors. If a common block is used, it preferably assumes the shape of a cube. FIG. 11 shows how a single cubical block 124 may include three RLGs. A first RLG 126 is formed by mirrors at faces 128 (front), 130 (left), 132 (rear), and 134 (right). A second RLG 136 is formed by mirrors at corners 130 (left), 138 (top), 134 (right), and 140 (bottom). A third RLG 142 is formed by mirrors at corners 128 (front), 138 (top), 132 (rear), and 140 (bottom). If mirrors are shared, as is shown in FIG. 11, the mass-compliance product of the shared mirrors must be selected to comport with all of the affected RLGs, and a change in any such RLG may require changes in the other RLG or RLGs.

INDUSTRIAL APPLICABILITY

The present invention is capable of exploitation in industry, and can be used, whenever an RLG is needed in a high translational acceleration environment. It can be made from components which, taken separate and apart from one another, are entirely conventional, or it can be made from their non-conventional counterparts.

While a preferred embodiment of the present invention has been described in detail, the true scope and spirit of the present invention is not limited thereto, but is limited only by the following claims.

What is claimed is:

1. An intense acceleration distortion resistant ring laser gyro (RLG) comprising a plurality of mirrors, wherein:
   (a) each mirror has a surface;
   (b) the mirrors define a closed optical path;
   (c) the optical path defines, at each mirror, a respective reflection angle between the optical path and the surface of the respective mirror;
   (d) each mirror has a mass (including the mass of any control apparatus mounted on the mirror) and a compliance;
   (e) one mirror, hereafter called the control mirror, defines an offset angle with respect to each mirror, the respective offset angle being equal to:
      (A) the angle between a plane containing the control mirror and a plane containing a respective other mirror, if the control mirror and the respective other mirror are not parallel; or
      (B) zero, if the control mirror and the respective mirror are parallel, coplanar, or identical;
   (f) each mirror has a characteristic parallel value equal to the product of its mass, its compliance, the cosecant of its reflection angle, and the sine of its offset angle;
   (g) each mirror has a characteristic perpendicular value equal to the product of its mass, its compliance, the cosecant of its reflection angle, and the cosine of its offset angle;
   (h) the sum of the characteristic parallel values of the mirrors is at least approximately zero, whereby the RLG is rendered resistant to distortion from intense acceleration parallel to the control mirror; and
   (i) the sum of the characteristic perpendicular values of the mirror is at least approximately zero, whereby the RLG is rendered resistant to distortion from intense acceleration perpendicular to the control mirror.

2. The RLG of claim 1, wherein the control mirror is a first control mirror and wherein at least one other mirror is a second control mirror.

3. The RLG of claim 2, wherein the first control mirror and the second control mirror control a common parameter.

4. The RLG of claim 1, wherein the mirrors other than the control mirror consist of two mirrors.

5. The RLG of claim 4, wherein the optical path of the RLG forms an isosceles triangle.

6. The RLG of claim 5, wherein the mirrors other than the control mirror are semi-parallel to each other.

7. The RLG of claim 6, wherein the optical path of the RLG forms an equilateral triangle.

8. The RLG of claim 1, wherein the mirrors other than the control mirror consist of three mirrors.

9. The RLG of claim 8, wherein a mirror other than the control mirror is anti-parallel to the control mirror.

10. The RLG of claim 9, wherein the optical path of the RLG forms a rectangle.

11. The RLG of claim 10, wherein the optical path of the RLG forms a square.

12. The RLG of claim 1, wherein the optical path of the RLG forms a pentagon.

13. The RLG of claim 1, wherein the optical path of the RLG forms a hexagon.

14. A plurality of intense acceleration distortion resistant ring laser gyros (RLGs), wherein:
   (a) each RLG comprises at least three mirrors, and:
      (1) each mirror has a surface;
      (2) the mirrors define a closed optical path;
      (3) the optical path defines, at each mirror, a respective reflection angle between the optical path and the surface of the respective mirror;
      (4) each mirror has a mass (including the mass of any control apparatus mounted on the mirror) and a compliance;
      (5) one mirror, hereafter called the control mirror, defines an offset angle with respect to each mirror, the respective offset angle being equal to:
         (A) the angle between a plane containing the control mirror and a plane containing a respective other mirror, if the control mirror and the respective other mirror are not parallel; or
         (B) zero, If the control mirror and the respective mirror are parallel, coplanar, or identical;
      (6) each mirror has a characteristic parallel value equal to the product of its mass, its compliance, the cosecant of its reflection angle, and the sine of its offset angle;
      (7) each mirror has a characteristic perpendicular value equal to the product of its mass, its compliance, the cosecant of its reflection angle, and the cosine of its offset angle;
      (8) the sum of the characteristic parallel values of the mirrors is at least approximately zero, whereby the RLG is rendered resistant to distortion from intense acceleration parallel to the control mirror; and
      (9) the sum of the characteristic perpendicular values of the mirror is at least approximately zero, whereby the RLG is rendered resistant to distortion from intense acceleration perpendicular to the control mirror;
   (b) each RLG includes means for measuring rotation about an axis associated with the RLG, and the plurality of RLGs further comprises means for maintaining the axis associated with each RLG in a fixed relationship with, and a direction different from, the axis associated with each other RLG.

15. The plurality of RLGs of claim 14, wherein the axis maintenance means comprises a monolithic block including each of the RLGs.

16. The plurality of RLGs of claim 15, wherein the monolithic block assumes the shape of a cube.

* * * * *